United States Patent [19]

Maehara et al.

[11] Patent Number: 4,650,996
[45] Date of Patent: Mar. 17, 1987

[54] ANGLE TRANSDUCER EMPLOYING POLARIZED LIGHT

[75] Inventors: Osamu Maehara; Yoshitaka Nakajima, both of Kanagawa, Japan

[73] Assignee: Kabushiki Kaisha Ono Sokki, Tokyo, Japan

[21] Appl. No.: 638,697

[22] Filed: Aug. 8, 1984

[30] Foreign Application Priority Data

Aug. 11, 1983 [JP] Japan .................................. 58-146855
Dec. 7, 1983 [JP] Japan ............................ 58-189033[U]
Dec. 7, 1983 [JP] Japan ............................ 58-189034[U]

[51] Int. Cl.$^4$ ............................................. G02F 1/01
[52] U.S. Cl. .............................. 250/231 SE; 250/225; 340/347 P
[58] Field of Search .............. 250/225, 211 K, 237 G, 250/231 SE; 455/616; 340/347 P; 350/111, 396; 356/364, 366, 367

[56] References Cited

U.S. PATENT DOCUMENTS

| | | | |
|---|---|---|---|
| 2,966,673 | 12/1960 | Guernsey | 250/225 |
| 3,306,159 | 2/1967 | Beall et al. | 250/225 |
| 3,397,608 | 8/1968 | Ellis | 350/396 |
| 3,687,555 | 8/1972 | Yamamoto et al. | 250/225 |
| 4,271,354 | 6/1981 | Shellenberger | 250/225 |

Primary Examiner—David C. Nelms
Assistant Examiner—S. Allen
Attorney, Agent, or Firm—Cushman, Darby & Cushman

[57] ABSTRACT

An angle transducer which photo-electrically measures the rotation angle of a shaft by utilizing, a polarizer disc is arranged as follows: the polarizer disc is secured to the shaft to be measured or to the detection shaft of the angle transducer. Two pairs of photo-electric conversion elements are in opposition to light sources across the polarizer disc. The first and second polarizer plates are interposed between the photo-electric conversion elements of each pair. The transmission axes of the first and second polarizer plates differ from each other by 45 degrees. The quantities of light emitted by the light sources or the outputs of the photo-electric conversion elements are modulated by carrier waves of two phases differing 90 degrees from each other. The amplitudes of the outputs correspond to the sine and cosine functions of the double angle of the rotation angle of the shaft to be measured. These outputs form modulated waves of two phases differing 90 degrees from each other. The sum of the modulated waves of two phases, and the difference between the sum and a signal obtained by multiplication of the two phase carrier waves by a predetermined value, are computed by addition and subtraction computers to obtain a phase signal of a sine wave the phase of which is proportional to the rotation angle of the shaft being measured.

8 Claims, 11 Drawing Figures

ANGLE TRANSDUCER EMPLOYING POLARIZED LIGHT

BACKGROUND OF THE INVENTION

1. Field of the Invention

This invention relates to a photoelectric angle transducer employing a polarizer disc and more particularly to an angle transducer arranged to produce a sine wave output which varies in proportion to the angle to be measured.

2. Description of the Prior Art

In a control system for controlling the rotation angle of the arm of a robot, the table of a machine tool or the like, an angle transducer such as a rotary encoder, a resolver, etc. is used for detecting a feedback signal. Among these angle transducers, the resolver has a high resolution despite a simple structure thereof, and moreover enables one to obtain angle information at every period of the carrier wave thereof. The resolver has first and second coils which are wound around the poles of a stator arranged perpendicularly crossing two directions. The third coil is wound around a rotor which rotates within the resolver. Carrier waves Va and Vb which have a 90 degree phase difference relative to each other are supplied to the first and second coils. The carrier waves Va and Vb can be expressed as follows:

$$Va = V2 \sin \omega t$$
$$Vb = V2 \cos \omega t \qquad (1)$$

wherein V2 represents the amplitude of the carrier wave, and $\omega$ the angular velocity of the carrier wave.

These poles are thus arranged to radiate magnetic flux corresponding to the carrier waves. Therefore, when the rotor is allowed to rotate by coupling it with a shaft to be measured, the ratio of a portion of each radiated magnetic flux that interlinks with the rotor varies with the angle of rotation $\theta$. As a result, at the third coil, there is induced a phase signal Vc which changes the phase thereof accordingly as the rotation angle $\theta$ changes and which can be expressed as follows:

$$Vc = K2 \ V2 \cos \omega t \sin \theta + K2 \ V2 \sin \omega t \cos \theta \qquad (2)$$
$$= K3 \ V2 \sin (\omega t + \theta)$$

wherein K2 and K3 represent coefficients of proportion.

However, since the resolver is using the above stated means for generating an electromagnetic signal, it necessitates use of a coil and a rotary transformer in order to receive a signal from the coil. This restricts any possible reduction in size. Further, the rotor has a greater moment of inertia than that of a rotary encoder. In addition to these problems, in order to obtain the desired magnetic flux distribution, the shape and allocation of the coil must be very precisely determined during the manufacturing process. This results in an increase in the cost thereof.

These shortcomings of the resolver stem from the use of the electromagnetic signal generating means. Therefore, it is conceivable to solve these problems by use of photo-electric signal generating means in place of the electromagnetic signal generating means. An example of known angle transducers based on this concept has been disclosed, for example, in U.S. Pat. No. 3,306,159. In that case, the rotor is arranged to be a polarizer disc.

This polarizer rotor is opposed to first -fourth polarizer plates. The transmission axes of these polarizer plates are arranged on the tilt differing 45 degrees from each other. The first - fourth polarizer plates and the polarizer rotor are interposed between light sources and first -fourth photoelectric conversion elements which are opposed to the light sources, respectively. The output signals of these first - fourth photo-electric conversion elements are arranged to modulate the amplitude of carrier waves mutually deviating by 90 degrees in phase. The four modulated signals thus obtained are arranged in preparation for addition. The operation of the angle transducer which is arranged in this manner is as described by the formulas below. Assuming that the light quantity of the light source is Io and the intersectional angle of the transmission axes of the polarizer rotor and the polarizer plate is $\alpha$, the quantity of light $I_\alpha$ reaching the photo-electric conversion element can be expressed by the law of Malus as follows:

$$I_\alpha = I_0\{(H_0 - H_{90})\cos^2\alpha + H_{90}\} \qquad (3)$$
$$= I_0(K_4\cos2\alpha + K_5) = I_0\beta$$

wherein $H_0$: transmission factor of parallel position ($\alpha = 0$); $H_{90}$: transmission factor of orthogonal position ($\alpha = 90$); $K_4 = (H_0 - H_{90})/2$; $K_5 = (H_0 + H_{90})/2$ and $\beta$: transmission factor at intersectional angle $\alpha$.

Therefore, assuming that the rotation angle of the polarizer rotor is $\theta$, the transmission factors $\beta a$ –$\beta d$ of the first - fourth polarizer plates which have their transmission axes mutually deviating by 45 degrees can be expressed as follows:

$$\beta a = K_4\cos2\theta + K_5$$
$$\beta b = K_4\cos2(\theta+45°) + K_5 = -K_4\sin2\theta + K_5$$
$$\beta c = K_4\cos2(\theta+90°) + K_5 = -K_4\cos2\theta + K_5$$
$$\beta d = K_4\cos2(\theta+135°) + K_5 = K_4\sin2\theta + K_5 \qquad (4)$$

As a result, voltage signals fa'–fd' generated at the photo-electric conversion elements result in a correspondence with the transmission factors of formula (4) above. Then, with the coefficients of proportion $K_4$ and $K_5$ replaced with predetermined coefficients $K_6$ and $K_7$, the voltage signals can be expressed as follows:

$$fa' = K_6\cos2\theta + K_7$$
$$fb' = -K_6\sin2\theta + K_7$$
$$fc' = -K_6\cos2\theta + K_7$$
$$fd' = K_6\sin2\theta + K_7 \qquad (5)$$

Next, the amplitudes of the carrier waves which have their phases mutually deviating by 90 degrees are modulated by these voltage signals to obtain modulated signals ja'–jd', which can be expressed as follows:

$$ja' = K_6\cos2\theta\sin\omega t + K_7\sin\omega t$$
$$jb' = -K_6\sin2\theta\cos\omega t + K_7\cos\omega t$$
$$jc' = K_6\cos2\theta\sin\omega t - K_7\sin\omega t$$
$$jd' = -K_6\sin2\theta\cos\omega t - K_7\cos\omega t \qquad (6)$$

The modulated signals ja'–jd' are added together. As a result of this addition, a phase signal P of a sine wave which has its phase in variation with the double angle of the rotation angle $\theta$, is obtained. The phase signal P can be expressed as follows:

$$P = 2K_6(\cos 2\theta \sin \omega t - \sin 2\theta \cos \omega t) \quad (7)$$

$$= 2K_6 \sin(\omega t - 2\theta)$$

However, the angle transducer of the prior art inevitably has a somewhat complex structure as it necessitates use of a light source, four polarizer plates, four photo-electric conversion elements and a polarizer rotor. To solve this problem, U.S. Pat. No. 3,932,039 has disclosed an angle transducer in which the number of the polarizer plates and that of the photo-electric conversion elements are respectively reduced to two.

In this angle transducer, two of the voltage signals shown in formula (5) above, say, the signals fa' and fb' are taken out. The ratio of the two voltage signal fa'/fb' is compared with that of reference waves Va and Vb, which are obtained from the above stated carrier waves and can be expressed as follows:

$$Va = Et\cos\omega t + Kt$$

$$Vb = Et\cos(\omega t + 90°) + Kt = -Et\sin\omega t + Kt \quad (8)$$

wherein Et and Kt represent constants.

When the ratio fa'/fb' comes to coincide with the ratio Va/Vb, the angle transducer produces a pulse. In other words, a coincidence pulse is arranged to be produced when the following condition is satisfied:

$$\frac{K_6\cos 2\theta + K_7}{-K_6\sin 2\theta + K_7} = \frac{Et\cos\omega t + Kt}{-Et\sin\omega t + Kt} \quad (9)$$

Thus, the pulse is produced every time a condition of $2\theta = \omega t$, i.e. time $t = 2\theta/\omega$, is satisfied. Accordingly, the time width of a synchronizing pulse generated for every period of the above stated reference wave Va or Vb and the above stated coincidence pulse, varies with the double angle of the rotation angle $\theta$. In the case of the transducer, the phase signal is thus obtained in the form of a square wave the time width of which varies according to the double angle of the rotation angle $\theta$. The transducer is capable of solving the problems of the resolver with simplified structural arrangement for reduction in size. However, it is a shortcoming of the angle transducer that, unlike the above stated resolver and the angle transducer of U.S. Pat. No. 3,306,159, the phase signal obtained by the transducer is either in the form of a pulse train or a square wave. This presents a problem, for example, in a case where the angle transducer is to be used for detection of the feedback signal of a synchronous motor control system of the permanent magnet type. In such a case, if the phase signal is of a sine wave form, phase difference signals can be prepared to represent phase differences between the phase signal and carrier waves mutually deviating in phase by 90 degrees. Then, the magnitude of each of these phase difference signals comes to correspond to the phase of the phase signal as it is. In other words, they come to correspond to the sine function of double angle of the rotation angle $\theta$ and to sine functions deviating therefrom by 90 degrees in phase. Therefore, with the phase difference signals converted into three phase signals, motor driving sine wave signals of three phases can be obtained, whereas, in the event of the phase signal of a square wave form, if phase difference signals representing phase differences between the phase signal and the carrier waves mutually deviating by 90 degrees in phase are prepared, the magnitude of each phase difference signal comes to correspond to the phase of the phase signal. In other words, it comes to correspond to a triangular wave of the rotation angle $\theta$ and a triangular wave deviating therefrom by 90 degrees in phase. Therefore, this necessitates the use of an additional circuit for converting the triangular wave into a sine wave. In accordance with the arrangement of this transducer, therefore, it is inevitable to have a more complex circuit and a response delay resulting from the use of the complex circuit.

SUMMARY OF THE INVENTION

It is a principal object of this invention to provide a photo-electric type angle transducer which is capable of producing a phase signal of a sine wave despite simplified structural arrangement thereof.

It is another object of the invention to provide a photo-electric type angle transducer arranged in a compact size.

The angle transducer according to the invention uses two polarizer plates and two photo-electric conversion elements in the same manner as in the angle transducer of the prior art described in the foregoing. However, unlike the prior art angle transducer, the phase signal is arranged to be taken out in the form of a sine wave according to the invention. A polarizer disc is either secured directly to a shaft to be measured or secured to a detection shaft coupled with the shaft to be measured. Two pairs of light sources and light receiving parts or reflecting mirrors, light sources and light receiving parts are in opposition across the polarizer disc. The first and second polarizer plates are interposed between each pair of the light source parts and the light receiving parts. The transmission axes of the first and second polarizer plates are arranged to deviate by 45 degrees from each other. Either the light quantity emitted from each of the light source parts or the output of each light receiving part is arranged to be modulated by carrier waves of phases mutually deviating by 90 degrees. According to the law of Malus, the quantities of light passing through the polarizer disc and the first and second polarizer plates are arranged to vary in correspondence to the sine of a double angle of the rotation angle of the polarizer disc and to the sine function of a phase differing 90 degrees therefrom. Accordingly, each of the modulated signals contains therein signal components of amplitudes corresponding to the sine of the double angle of the rotation angle and sine functions of phases differing 90 degrees therefrom and of the same frequency as that of the carrier waves of the 90 degree phases. The above stated modulated signal further includes a redundant signal component which has an unvarying amplitude and is of the same frequency as the corresponding carrier wave. The redundant signal component is removed by subtracting a signal obtained by multiplying the carrier wave by a predetermined value from the sum of the two moaulated signals with the use of an adding and subtracting means. Through this process, a phase signal of a sine wave form the phase of which varies in proportion to the rotation angle of the polarizer disc, i.e. to the rotation angle of the shaft being measured, is obtained.

These and further objects and features of the invention will become apparent from the following detailed description of preferred embodiment thereof taken in connection with the accompanying drawings.

DESCRIPTION OF PREFERRED EMBODIMENTS

Figure 1:
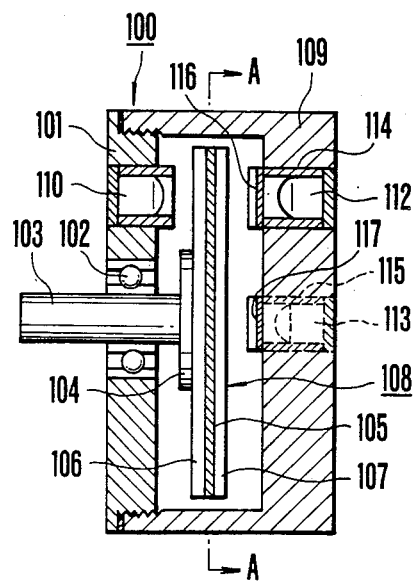
FIG. 1 is a sectional front view showing the arrangement of a mechanism of an embodiment of the invention.
Figure 2:
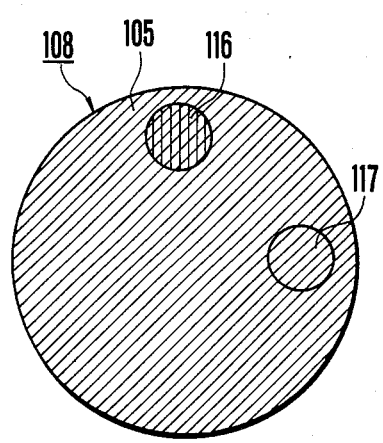
FIG. 2 is a sectional view taken along line A—A of FIG. 1.
Figure 4:
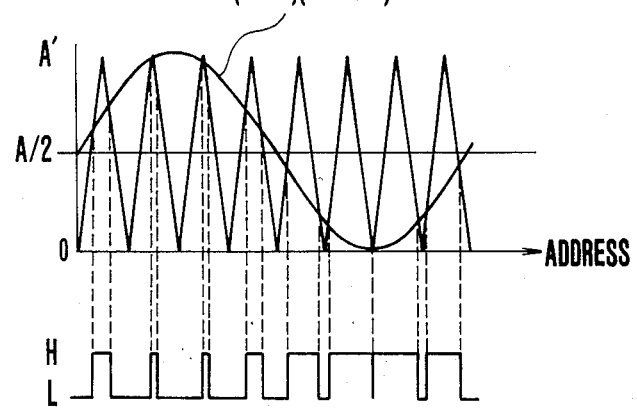
FIG. 4 is a wave form chart showing, by way of example, the memory data stored at a read-only memory shown in FIG. 3.

Referring to FIGS. 1 and 2 which show the arrangement of the mechanism of an embodiment of the invention, an angle detecting shaft 103 is rotatably supported via a bearing 102 on the front cover 101 of a case 100. To the rear end 104 of the detecting shaft 103 which is pierced into the case 100 is secured a polarizer rotor 108. The rotor 108 is prepared by cementing together thin transparent discs 106 and 107 with a polarizer disc 105 interposed between them. Two light sources such as light emitting diodes 110 and 111 are secured to the front cover 101 which is located on the left side of the polarizer rotor 108. (In the drawing, the diode 111 is not shown as it is located behind the detecting shaft 103.) Meanwhile, photo-electric conversion elements such as photo-transistors 112 and 113 are secured to the bottom wall 109 of the case 100 on the right side of the rotor 108 and are thus opposed to the light emitting diodes 110 and 111 across the polarizer rotor 108. In front of these photo transistors, there are arranged first and second polarizer plates 116 and 117 which are secured to carrying cases 114 and 115, respectively. The transmission axes of these polarizer plates 116 and 117 are arranged to mutually deviate by 45 degrees.

Figure 11:
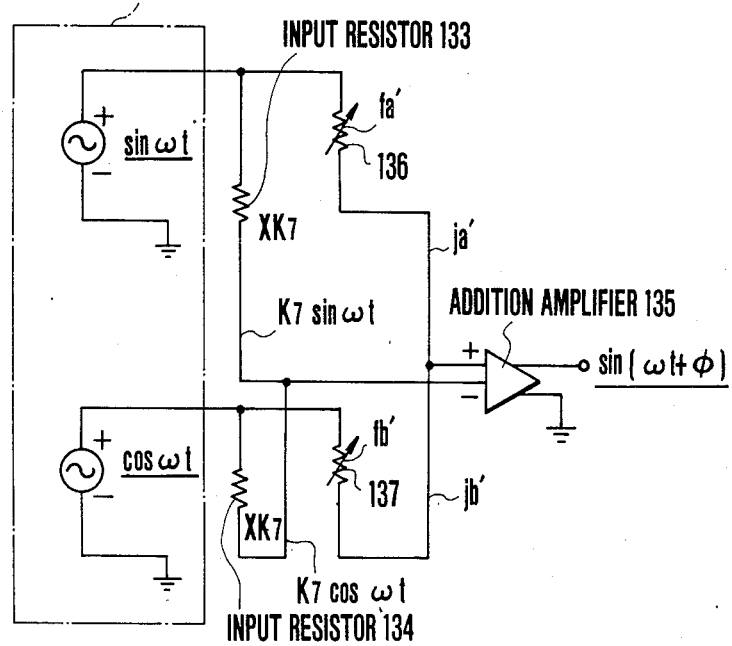
FIG. 11 is a block diagram showing an embodiment of the signal processing system according to the present invention.

With the embodiment arranged in this manner, when the light emitting diodes 110 and 111 are lit up, the light fluxes from these diodes are introduced to the photo-transistors 112 and 113 via the polarizer disc 108 and the first and second polarizer plates 116 and 117 which are disposed on the optical paths and have their transmission axes mutually deviating by 45 degrees. The rate of light quantities reaching the photo transistors 112 and 113, i.e. the transmission factors, are $\beta a$ and $\beta b$ as shown in Formula (4) above. Accordingly, voltage signals thus produced at the photo transistors 112 and 113 become fa' and fb' as shown in Formula (5). Then, in the signal processing system shown in FIG. 11, the voltage signals fa' and fb' are multiplied at multiplication circuits 136 and 137 by the carrier waves $\sin\omega t$, $\cos\omega t$ which are mutually deviating 90 degrees in phase, and which are produced by the carrier wave oscillator 126, and are thus converted into the amplitude modulated signals ja' and, jb' as shown in Formula (6) above. The signals ja' and jb' thus obtained are applied to the addition terminals of an addition amplifier 135.

The signal processing system which has been described in the foregoing is exactly the same as the prior art system disclosed in the above stated U.S. Pat. No. 3,306,159 with the exception that two of the four polarizer plates and two of the four photo-electric conversion elements employed by the prior art system are omitted in the case of this embodiment. The result of addition performed by the above stated addition amplifier can be expressed as follows:

$$ja' + jb' = K_6(\cos 2\theta \sin\omega t - \sin 2\theta \cos\omega t) + K_7(\sin\omega t + \cos\omega t) \quad (10)$$

$$= K_6 \sin(\omega t - 2\theta) + K_7(\sin\omega t + \cos\omega t)$$

As apparent from Formula (10) above, the first term of the formula represents a phase signal of a sine wave of a phase corresponding to the double angle of the rotation angle $\theta$ of the polarizer disc 108. However, the second term is redundant. Therefore, in this signal processing system, the carrier waves $\sin\omega t$ and $\cos\omega t$ which are produced from the above stated carrier wave oscillator 126 with their phase arranged to be mutually deviating by 90 degrees are multiplied by $K_7$ via input resistors before they are applied to the subtraction terminals of the above stated addition amplifier 130.

Figure 5:
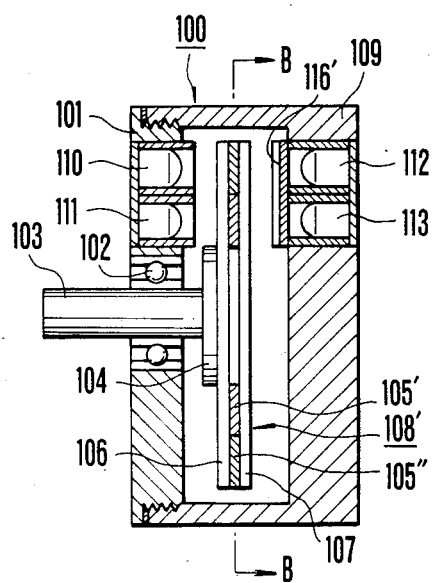
FIG. 5 is a sectional front view showing the arrangement of a mechanism of another embodiment of the invention.
Figure 6:
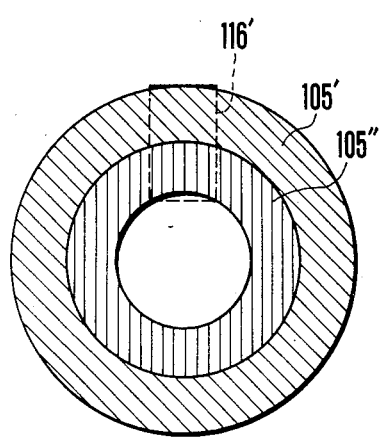
FIG. 6 is a sectional view taken along line B—B of FIG. 5.

In this embodiment, as described above, a phase signal is obtained in the form of a sine wave through one polarizer disc, two light sources, two polarizer plates, two photo-electric conversion elements, one carrier wave oscillator and one addition amplifier. Further, in the mechanism of the embodiment described, the number of the light sources of course can be changed to one instead of two in cases where the photo-electric conversion elements can be irradiated with light from a single light source through the polarizer disc and the first and second polarizer plates. In the mechanism of the embodiment, the transmission axes of the two polarizer plates are arranged to be mutually deviating by 45 degrees. However, in accordance with this invention, the polarizer disc 108 and polarizer plates 116 and 117 shown in FIGS. 2 and 3 may be replaced with a different arrangement which is as shown in FIGS. 5 and 6. In this case, a polarizer disc 108' is provided with doughnut-like polarizer parts 105' and 105" which have their transmission axes mutually deviating 45 degrees and are arranged in combination with a common polarizer plate 116'. Further, while the polarizer disc is secured to the detecting shaft which is coupled with the shaft to be measured in the mechanism of this specific embodiment, the embodiment may be arranged into a built-in type by connecting the polarizer disc directly to the shaft to be measured.

Figure 7:
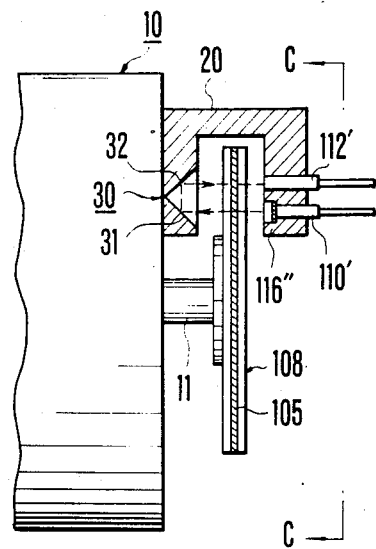
FIG. 7 is a sectional front view showing the mechanism of a further embodiment of the invention which is arranged as a built-in type.
Figure 8:
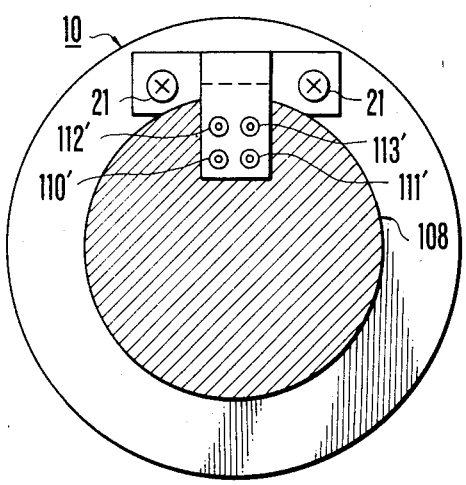
FIG. 8 is a sectional side view taken along line C—C of FIG. 7.

FIGS. 7 and 8 show an example of the mechanism of a built-in type embodiment of the invention. In this case, a polarizer disc 108 is secured to an object of measurement which is, for example, a rotating shaft 11 protruding from the rear wall of a motor 10. The disc 108 is interposed between two leg parts of a C-shaped holding frame 20 which is secured to the rear wall of the motor 10 by means of screws 21. The front-ends of four optical fiber members 110', 111', 112' and 113' are secured to the outer leg part of the holding frame 20. The rear-ends of the optical fiber members 110' and 111' are connected to light sources while the rear-ends of other members 112' and 113' are connected to photo-electric conversion elements. Meanwhile, first and second polarizer plates 116'' and 117'' (the latter is not shown) are arranged to have their transmission axes mutually deviating 45 degrees and are secured respectively to the front-ends of the optical fiber members 110' and 111'. To the inner leg part of the frame 20 which is opposed to these optical fiber members 110'-113' is secured a rectangular prism 30. The prism 30 is provided with reflecting faces 31 and 32 which are opposed at an angle of 45 degrees to lines respectively passing at intermediate points between the optical fiber members 110' and 112' and between the members 111' and 113'. Light fluxes from the light sources pass through the polarizer plates 116'' and 117'' via the optical fiber members 110' and 111' and reach the reflecting face 31 via the polarizer disc 108. The light fluxes are then deflected 90 degrees to reach the other reflecting face 32. The light fluxes are then again deflected 90 degrees and again pass through the polarizer disc 108 to come to the optical fiber members 112' and 113'. Then, the light fluxes respectively reach the photo-electric conversion elements which are connected to the rear-ends of these optical fiber members. In this embodiment, reduction in the size required for the built-in type arrangement is understood by arranging the optical fiber members on one side of the embodiment.

Figure 9:
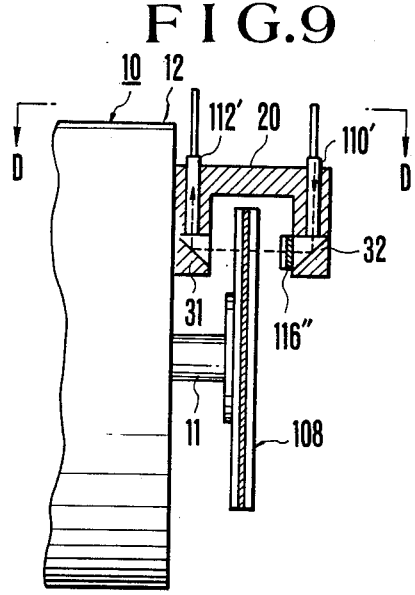
FIG. 9 is a sectional front view showing the mechanism of another built-in type embodiment of the invention.
Figure 10:
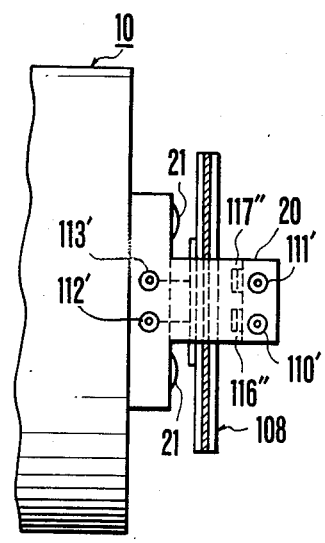
FIG. 10 is a plan view taken in the direction of line D—D of FIG. 9.

FIGS. 9 and 10 show another example of embodiment of the built-in type. This example is applicable to a system where no space is available for lateral arrangement of the optical fiber members as in the foregoing embodiment example. In this case, the polarizer disc 108 and the holding frame 20 are arranged similarly to the arrangement shown in FIGS. 7 and 8. Front-end parts of optical fiber members 110', 111', 112' and 113' are inserted from above into the leg parts of the holding frame 20. Reflecting faces 31 and 32 are disposed at the front-ends of these optical fiber members. Polarizer plates 116'' and 117'' having their transmission axes mutually deviating 45 degrees are disposed in front of the reflecting face 32 which is opposed to the optical fiber members 110' and 111'. Light fluxes coming from the optical fiber members 110' and 111' are thus arranged to reach the optical fiber members 112' and 113' via the reflecting face 32, polarizer plates 116'' and 117'', the polarizer disc 108 and the reflecting face 31. Therefore, the optical fiber members are arranged in the orthogonal direction relative to the rotating shaft 11, so that the length in the axial direction can be made small. Further, in the built-in type arrangement described, the polarizer plates 116'' and 117'' are disposed on the side of the light source. However, the same effect can be attained by arranging them in any desired positions in the optical paths between the light sources and the photo-electric conversion elements.

Next, in the signal processing system of this embodiment, the outputs of the photo-electric conversion elements are multiplied by the carrier waves to obtain the above stated amplitude modulated waves ja' and jb'. This arrangement, however, may be replaced with an arrangement in which the emitting light quantities of the light sources vary according to the carrier waves mutually deviating 90 degrees in phase. In other words, carrier waves sinωt and cosωt of 90 degree phase difference produced from a carrier wave oscillator (not shown) are supplied to lighting control circuits (not shown) of the light emitting diodes 110 and 111 shown in FIGS. 1 and 2 to have the emitting light quantities ea and eb of these light emitting diodes controlled as shown below:

$$ea = (A/2)(\sin\omega t + 1)$$

$$eb = (A/2)(\cos\omega t + 1) \quad (11)$$

wherein A/2 represents the amplitude of the emitting light quantity.

The light quantities ea and eb are always of positive values and vary between 0 and A with light quantity A/2 in the middle of this range. The light quantities ea and eb are multiplied by βa and βb (see Formula (4)) through the polarizer disc 108 and the polarizer plates 116 and 117 as applicable and thus reach the photo transistors 112 and 113. As a result, photo transistors 112 and 113 produce voltages ga' and gb' as shown in the following formula:

$$ga' = K_6\cos2\theta\sin\omega t + K_7\sin\omega t + K_6\cos2\theta + K_7$$

$$gb' = -K_6\sin2\theta\cos\omega t + K_7\cos\omega t - K_6\sin2\theta + K_7 \quad (12)$$

Then, in the same manner as in the preceding embodiment example, the two voltages ga' and gb' are subjected to an addition operation performed by an addition amplifier (not shown) and are also subjected to a subtraction operation performed with the products $K_7\sin\omega t$ and $K_7\cos\omega t$ obtained by multiplying carrier waves by a predetermined value. As a result of this operation, the output of the addition amplifier becomes as follows:

$$ga' + gb' - K_7\sin\omega t - K_7\cos\omega t = K_6\sin(\omega t - \theta) + K_6(\cos2\theta - \sin2\theta) \quad (13)$$

With the emitting light quantities arranged to be changed according to the carrier waves in this manner, the output of the addition amplifier includes a redundant component $K_6(\cos2\theta - \sin2\theta)$ unlike in the case of the preceding embodiment example wherein the outputs of the photo-electric conversion elements are multiplied by carrier waves. However, this is removable by simply passing the output through a high-pass filter. Further, in this case, it is possible to make the number of the photo-electric conversion element one; to introduce the light fluxes coming through the polarizer plates into the single photo-electric conversion element; and to have an addition operation performed by the photo-electric conversion element.

Further, in the embodiment which is arranged to have the emitting light quantities changed in accordance with the carrier waves, the stability of operation can be enhanced by arranging the carrier waves to be pulse width modulated and stored beforehand and to be read out according to the lapse of time.

Figure 3:
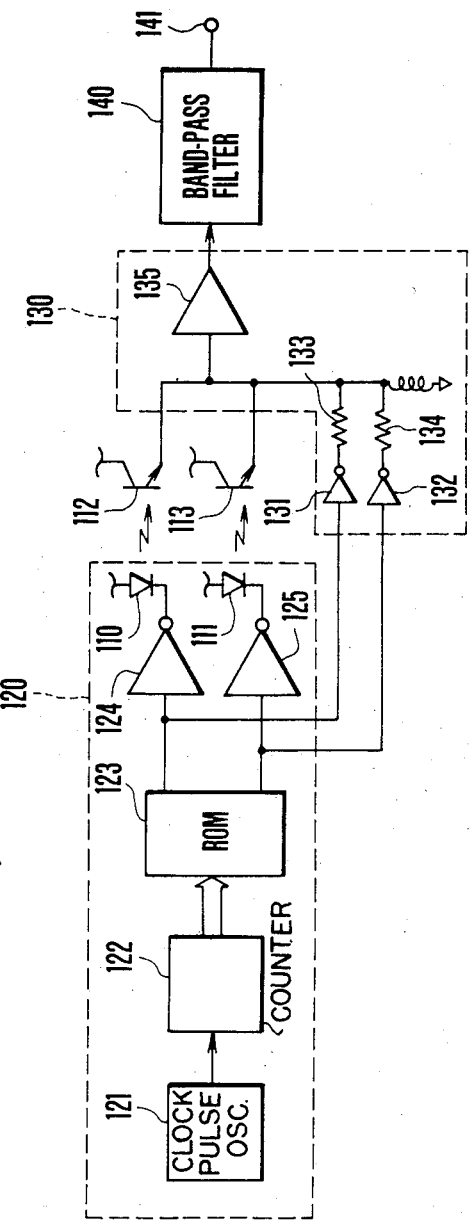
FIG. 3 is a block diagram showing the signal processing system arranged according to the invention.

An example of the above stated signal processing system is as shown in FIG. 3. Referring to FIG. 3, the system includes light emitting diodes 110 and 111 and photo transistors 112 and 113 which are indicated by the same reference numerals as in FIGS. 1 and 2; a light emitting part 120; a clock pulse oscillator 121; a counter 122 which repeatedly counts clock pulses produced from the oscillator 121; a read-only memory 123 which receives the count output of the counter 122 as a read address designation signal and has addresses written with pulse width modulated signals of sine waves which mutually deviate 90 degrees in phase; and driving circuits 124 and 125 which control the light emitting time widths of the light emitting diodes 110 and 111 according to the outputs produced from the output terminals (for reading out the pulse width modulated signals mutually deviating 90 degrees in phase) of the read-only memory 123, codes "H" and "L" which are obtained by pulse-width modulating of the sine wave (A1/2) (sin$\omega$t+1) and a sine wave differing 90 degrees in phase therefrom are respectively written in the addresses corresponding to the axis of time.

Therefore, the pulse width modulated sine waves mutually deviating 90 degrees in phase are read out according to the number of clock pulses oscillated from the cloth pulse oscillator 121, namely the lapse of time, and the light emitting time widths of the light emitting diodes 110 and 111 are controlled accordingly. Therefore, the combination of these elements 122, 123 constitute a carrier wave oscillator. However, the carrier waves in this case are different from the sine waves in FIG. 11 but are pulse width modulating waves. The signal processing system further includes a light receiving part 130. The light receiving part 130 consists of photo transistors 112 and 113 which receive the light quantities emitted from the light emitting diodes 110 and 111 and come through the polarizer disc 108 and polarizer plates 116 and 117 and which produce voltages amplifier 135. The addition amplifier 135 has the outputs of corresponding to these light quantities; and an addition the photo transistors 112 and 113 introduced to the addition terminal thereof. Meanwhile, the pulse-width modulated signals of a 90 degree phase which are read out from the read-only memory 123 and respectively inverted by the inverters 131 and 132 and which are then multiplied by a predetermined value through input resistors 133, 134 are also applied to the addition terminal of the addition amplifier 135. In the light receiving part 130, therefore, a difference between the sum of the outputs of the photo transistors 112 and 113 and the signal obtained by multiplying the sine waves of 90.degree phase is computed. After that, the output of the addition amplifier 135 is supplied to a band-pass filter 140. A low frequency component (corresponding to the double angle of the rotating angle of the polarizer disc 108) and a high frequency component (a triangular wave component resulting from pulse width modulation) are removed from the output of the addition amplifier 135 through the band-pass filter 140. Then, a phase signal the phase of which varies according to the double angle of the rotation angle $\theta$ of the polarizer disc 108 is obtained in the form of a sine wave from the output terminal 141 of the band-pass filter 140.

While the output of the embodiment described is obtained as a phase signal, in accordance with the invention, the output may be obtained in the form of an amplitude signal. In that event, in order to obtain carrier waves which have their amplitudes vary with the sine and cosine function of the double angle of the rotation angle $\theta$, the carrier waves are arranged to be in-phase and a signal obtained by multiplying the carrier wave in a predetermined ratio is subtracted from the output of each photo-electric conversion element.

The angle transducer according to the invention, as described in the foregoing, has a simple mechanism comprising one polarizer disc; two polarizer plates; one or two light sources; two or one photo-electric conversion elements; an addition amplifier; and a carrier-wave oscillator. A phase signal is obtained in the form of a sine wave by obtaining a difference between the sum of the outputs of the photo-electric conversion elements and the carrier waves. The invention permits reduction in size and contributes to the simplification of a control system with the invention applied to the detection of a feedback signal of an angle control system.

What we claim is:

1. An angle transducer employing polarized light, comprising:
    a rotatable polarizer disc;
    at least one light source means, opposed to one side of said polarizer disc, for producing light which travels along a path which passes through said polarizer disk;
    two photo-electric conversion means disposed in said path of the light from said light source means for producing outputs indicative of light incident thereupon;
    two polarizer plates disposed in optical paths between said light source means and said photo-electric conversion means and respectively having transmission axes which deviate by 45 degrees from each other;
    carrier wave oscillator means for generating sinusoidal waves which deviate 90 degrees in phase from each other;
    multiplication means, coupled to said oscillator means and said conversion means, for multiplying said sinusoidal waves and the outputs of said photo-electric conversion means to produce multiplication outputs;
    means for multiplying each of said sinusoidal waves by a predetermined value to produce a multiplication value; and
    additional amplifier means for computing a difference between a sum of said multiplication outputs and said multiplication value.

2. An angle transducer employing polarized light, comprising:
    a rotatable polarizer disc said disc including a plurality of polarizing circular parts, disposed in outer and inner peripheral parts of said disc, and having transmission axes arranged to deviate 45 degrees from each other;
    at least one light source means, opposed to one side of said polarizer disc, for illuminating said one side of said polarizer disk with light;
    a plurality of photo-eletric conversion means, disposed in paths of portions of the light from said light source means, for converting light incident thereupon into an output signal, said paths being ones which pass through said polarizer disc;
    a plurality of polarizer plates disposed in said paths between said light source means and said photoelectric conversion means;

carrier wave oscillator means for generating sinusoidal waves which deviate 90 degrees in phase from each other;

multiplication means, coupled to said oscillator means and said conversion means, for multiplying said sinusoidal waves and the outputs of said photo-electric conversion means to produce multiplication output signals;

means for multiplifying each of said sinusoidal waves by predetermined values to produce a multiplication value; and addition amplifier means for computing a difference between a sum of said multiplication output signals and said multiplication value.

3. An angle transducer employing polarized light, comprising:

a rotatable polarizer disc;

two light source means opposed to one side of said polarizer disc for illuminating said one side with light;

two photo-electric conversion means disposed in paths of portions of the light from said light source means, for converting light incident thereupon into an output signal indicative thereof, said paths being ones which pass through the polarizer disc;

two polarizer plates disposed in said paths between said light source means and photo-electric conversion means, and having transmission axes arranged to be deviating by 45 degrees from each other;

carrier wave oscillator means for generating sinusoidal waves deviating 90 degrees in phase from each other;

means for controlling a quantity of light emitted from each of said light source means according to said sinusoidal waves;

means, coupled to said osillator means, for multiplying said sinusoidal waves by predetermined values to produce a multiplication value;

additional amplifier means for computing a difference between a sum of said outputs of said two photo-electric conversion means and said multiplication value; and filter means for extracting a predetermined frequency component from the outputs of one of said photo-electric conversion means and the output of said addition amplifier means.

4. An angle transducer employing polarized light, comprising:

a rotatable polarizer disc said disc including a plurality of polarizing circular parts disposed in outer and inner peripheral parts of said disc, said polarizer disc having transmission axes which are arranged to deviate by 45 degrees from each other;

two light source means opposed to one side of said polarizer disc for illuminating said one side with light;

two photo-electric conversion means, disposed in paths of portions of the light of said light source means, said path passing through said polarizer disc, for converting light incident there upon into output signals indicative thereof;

a plurality of polarizer plates disposed in optical paths between said light source means and said photo-electric conversion means;

carrier waves oscillator means for generating sinusoidal waves deviating from each other by 90 degrees of phase;

lighting control means for controlling a quantity of light to be emitted from each of said light source means according to said sinusoidal waves;

means, coupled to said oscillator means, for multiplying said sinusoidal waves by predetermined values to produce a multiplication value;

addition amplifier means for computing a difference between a sum of the outputs of said two photo-electric conversion means and said multiplication value; and filter means for extracting a predetermined frequency component from the outputs of one of said photo-electric conversion means and the output of said addition amplifier means.

5. An angle transducer employing polarized light according to any of claims 1, 2, 3 and 4, wherein said light source means and said photo-electric conversion means are arranged opposite to one another with said polarizer disc therebetween.

6. An angle transducer according to any of claims 1, 2, 3 and 4, wherein said light source means and said photo-electric conversion means are both arranged on one side of said polarizer disc while returning reflection members are disposed on the other side of said polarizer disc.

7. An angle transducer employing polarized light according to any of claims 1, 2, 3 and 4, wherein said carrier wave oscillator means is also for generating pulse width modulated signals which are sinusoidal wave deviating 90 degrees in phase from each other.

8. An angle transducer employing polarized light according to any of claims 1, 2, 3 and 4, further comprising an optical fiber, and wherein said light source means and said photo-electric conversion means are opposed to each other through said optical fiber.

* * * * *